United States Patent Office 3,477,966
Patented Nov. 11, 1969

3,477,966
HIGH STRENGTH EPOXY RESINS PREPARED FROM EPICHLOROHYDRIN AND XYLYLENE GLYCOLS
Richard C. Doss, Bartlesville, Okla., assignor to Phillips Petroleum Company, a corporation of Delaware
No Drawing. Filed Nov. 23, 1966, Ser. No. 596,464
Int. Cl. C08g 30/14, 30/02; C09j 3/16
U.S. Cl. 260—2                                         5 Claims

ABSTRACT OF THE DISCLOSURE

A new epoxy resin prepared from epichlorohydrin and xylylene glycols, and cured products therefrom useful as adhesives.

---

This invention relates to novel, high strength epoxy resins.

In one aspect, the invention relates to novel epoxy resins which form adhesives of high strength, and which have the general formula

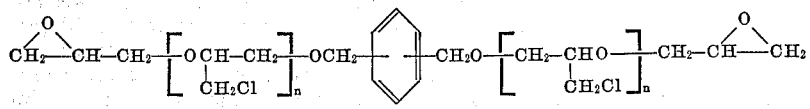

wherein $n$ is an integer of at least 1, preferably 1–3.

In another aspect, the invention relates to a polymerized epoxy resin of high strength formed by contacting an epoxy resin of the general formula shown above with a suitable curing agent.

In another aspect, the invention relates to a novel epoxy resin of high strength formed by contacting p-xylylene glycol with an excess of an epihalohydrin selected from epichloro- and epibromohydrin, preferably in the presence of a Lewis acid catalyst.

It is known in the art that the reaction of a polyhydric phenol with an epihalohydrin, such as epichlorohydrin, results in the formation of an epoxy resin having a high content of pendant halomethyl groups. When cured, such polymerized epoxy resins have lap shear strength on aluminum metal on the order of 1000–1500 pounds per square inch.

It is an object of this invention to provide a high strength epoxy resin which, when cured, has a lap shear strength in excess of 2500 pounds per square inch. It is also an object of this invention to provide a high strength, fire resistant epoxy resin which, when cured, has unusually high utility as an adhesive and coating composition.

Other aspects, objects, and the several advantages of this invention will be apparent to one skilled in the art upon reading this disclosure and the appended claims.

In accordance with the invention, a composition of matter comprising a compound of the general formula

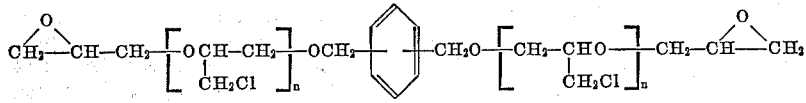

is provided, wherein $n$ is an integer of at least 1, preferably 1–3. When cured with a suitable curing agent, epoxy resins of the general formula shown above form adhesives and coating compositions of unusually high strength.

A method of forming the novel epoxy compounds of this invention comprises contacting a xylylene glycol selected from ortho-, meta-, and para-xylylene glycols with an excess of epihalohydrin selected from epichlorohydrin and epibromohydrin, preferably in the presence of a Lewis acid catalyst.

Broadly, a Lewis acid catalyst can be defined as an electron pair acceptor. Suitable condensation catalysts of this type include hydrofluoric acid, stannic chloride, ferric chloride, aluminum chloride, boron trifluoride and complexes of boron trifluoride, especially its complex with ether. The concentration of the catalyst employed can vary, depending upon the catalyst and the molecular weight of the polymer desired. In general, the catalyst can be employed in amounts varying from about 0.1 percent to about 5 percent by weight of the reactants.

The epihalohydrin is employed in an amount sufficient to provide at least four mols of epihalohydrin per mol of the xylylene glycol. A suitable molar ratio of epihalohydrin to xylylene glycol is, for example, from 4 to 8, or more. Best results are obtained when the epihalohydrin is added slowly throughout the course of the reaction. Care should be taken that these materials react continuously and do not accumulate in the reaction mixture is unconverted form because otherwise a violent reaction can result.

The temperatures used in the condensation reaction can vary over a wide range. In general, the temperatures can be in the range of from about 0 to about 150° C., and preferably from about 25 to 100° C. Higher temperatures result in faster reaction rates, but also can result in production of more highly colored products. In general, the condensation will require from about 5 minutes to about 25 hours, depending in part upon catalyst and temperature employed.

Resins formed in accordance with the method described are post treated with an alkaline material to produce the desired epoxy ethers. The reaction can be accomplished by adding the alkaline material directly to the reaction mixture used in preparing the polymers, or the polymer can be recovered before it is combined with an alkaline material. Any of the known dehydrohalogenation materials can be used in this reaction, such as sodium and potassium hydroxides, sodium and potassium carbonates and bicarbonates, hydroxides of magnesium, zinc, lead, iron, and aluminum, and the corresponding oxides, and the like.

The aluminates, silicates, and zincates of alkali metals, such as sodium and potassium aluminates and sodium and potassium zincates, are particularly good dehydrohalogenating agents when used in substantially, or completely, non-aqueous media.

The amount of dehydrohalogenating agent used can vary over a considerable range. However, in general, the product produced should be reacted with enough alkaline material to provide at least one equivalent of effective alkaline material, that is, one equivalent present after acidic catalyst has been neutralized, per halohydrin group. Less than the equivalent amount of the alkaline material can be used if all the halohydrin groups are not to be converted to the epoxy groups.

In most cases, the alkaline material can be applied to the halohydrin as an aqueous solution or suspension or dissolved in an inert solvent, such as ethers, aliphatic, cycloaliphatic and aromatic hydrocarbons, halogenated hydrocarbons, and the like. If the above-noted aluminates, silicates or zincates are used as the alkaline material, the dehydrohalogenation is preferably effected in an non-aqueous medium, and the salts per se are dissolved in organic solvents or diluents. Carbon tetrachloride, 1,4-dioxane and bis(2-chloroethyl) ether are particularly satisfactory as solvents for this purpose.

The dehydrohalogenation reaction can be accomplished at temperatures which preferably range from about 20° C. to about 150° C., and more preferably, from about 25° C. to about 100° C. The dehydrohalogenation reaction is generally carried out for a period of about 5 minutes to about 8 hours, usually about 15 minutes to about 4 hours.

At the end of the reaction period, the reaction mixture can be filtered through a suitable filtering medium, e.g., diatomaceous earth, to remove any alkali metal halide. The filtrate can then be treated to recover the epoxide. If the reaction has been conducted in the presence of water, care should be taken to avoid hydrolysis of the epoxide groups during the separation process. This can be accomplished by various extraction or distillation methods using subatmospheric pressures and conditions unfavorable to hydrolysis of the epoxide groups. Separation can be conveniently effected by treating the aqueous reaction mixture in a continuous extraction apparatus wherein any suitable extractant such as ester, alcohol, ether, hydrocarbon, etc., may be utilized. The extracted epoxide can be separated from its solution with the extractant by subjecting the preferably anhydrous solution to distillation or other separation operation.

In the case where the reaction has been conducted in the absence of water, but in the presence of solvents, as is preferably the case with the above-described aluminates, silicates and zincates, the novel polyepoxy polyethers can be recovered by any suitable method, such as distillation, extraction, and the like. If no solvent or diluent is employed, the polyepoxide may be recovered and purified by any convenient method, such as distillation, solvent extraction, fractional precipitation, and the like.

For certain applications, such as in the preparation of surface coating, fibers or filaments, it is sometimes desirable to have products of still higher molecular weights. Such products can be obtained by reacting the above-described polyepoxys with polyhydric compounds. Polyhydric compounds used for this purpose may be any polyhydric alcohol or polyhydric phenols. Polyhydric phenols that may be used for this purpose include, among others, resorcinol, catechol, hydroquinone, methyl resorcinol, and polynuclear phenols such as 2,2-bis(4-hydroxyphenyl)propane.

The new polyepoxy materials of this invention and their higher molecular weight derivatives produced as shown in the preceding paragraph can be polymerized through the epoxy groups to form valuable polymeric products. They can be polymerized alone or with other polyepoxide materials in a variety of different proportions, such as, for example, with amounts of other polyepoxides varying from 5 percent to 95 percent by weight. Polyepoxides that can be copolymerized with these new polyepoxides include, among others, glycidyl polyethers of polyhydric phenols obtained by reacting polyhydric phenols, such as bis-phenol, resorcinol, and the like, with an excess of chlorohydrin, such as epichlorohydrin in an alkaline medium; polyepoxide polyethers obtained by reacting an alkane polyol, such as glycerol and sorbitol, with epichlorohydrin and dehydrohalogenating the resulting product; polymers prepared from ethylenically unsaturated epoxides, such as allyl glycidyl ether, alone or with other ethylenically unsaturated monomers; and polyepoxide polyethers obtained by reacting a polyhydric alcohol or polyhydric phenol with any of the above-described polyepoxides.

A great variety of different curing agents can be employed in effecting the above-described homo- and copolymerization. Such agents include, among others, carboxylic acids or anhydrides, such as oxalic acid and phthalic anhydride; Friedel-Crafts metal halides, such as aluminum chloride, zinc chloride, ferric chloride and boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphtae; amino compounds, such as triethylamine, ethylenediamine, diethylamine, diethylenetriamine, triethylenetetramine, dicyandiamide and melamine; polyamide resins, e.g., from polycarboxylic acids and polyamines, having readily replaceable hydrogen atoms; and salts of inorganic acids, such as zinc fluoborate, potassium persulfate, nickel fluoborate, copper fluoborate, selenium fluoborate, magnesium fluoborate, tin fluoborate, potassium perchlorate, cupric sulfate, cupric phosphate, cupric phosphite, magnesium arsenate, magnesium sulfate, cadmium arsenate, cadmium silicate, aluminum fluoborate, ferrous sulfate, ferrous silicate, manganese hypophosphite, nickel phosphate and nickel chlorate.

The amount of the curing agents employed can vary over a considerable range depending upon the agent selected. With curing agents having replaceable hydrogen, such as the amine agents, amounts of agent employed vary up to and including quantities sufficient to furnish two replaceable hydrogen atoms for every epoxy group to be reacted. In most cases, satisfactory cures are obtained with amounts varying from 1 percent to 60 percent by weight of the material being polymerized, the amount of curing agent depending in part on the molecular weight of the curing agent and the number of replaceable hydrogen atoms in each molecule of the curing agent. With the phosphoric acid and eters, particularly preferred amounts vary from about 3 percent to 20 percent by weight. The other curing agents are preferably employed in amounts varying from 1 percent to 20 percent.

The curing is preferably effected by mixing the curing agent with the polyepoxide and heating the mixture, preferably at temperatures ranging from about 20° C. to 200° C. Solvent or diluents can be employed in the polymerization depending upon the intended application of the polymer and ease of operation of the polymerization reaction.

If the polyepoxides of the invention are to be used in the preparation of castings or pottings, the curing agent and the epoxy material are generally combined together and then poured into the desired mold or casting containing the electrical wires or apparatus and the mixture heated to effect the cure.

The polyepoxides and their higher molecular weight derivatives can also be employed with the afore-described curing agents to prepare improved surface coating compositions of the air-drying or baking type. In utilizing the products for this application, it is generally desirable to combine the epoxy material and curing agent with the desired solvents, and if desired, other film-forming materials and driers, and then apply the resulting mixture to the surface to be coated. Film-forming materials that can be used with the epoxy material in this manner include the drying oils, such as tung oil, linseed oil, dehydrated castor oil, soybean oil, and the like; cellulose derivatives such as cellulose nitrate, cellulose acetate, cellulose acetate butyrate, cellulose propionate, ethyl cellulose, and mixtures thereof; and viny polymers, such as polymers of vinyl chloride, vinylidine chloride, methyl methacrylate, diallyl phthalate, and the like. The coatings prepared in this manner can be allowed to set to a hard finish at room temperature or heat can be applied to hasten the cure.

The new polyepoxides can also be employed with the curing agents to prepare valuable adhesive compositions. In utilizing the products for these applications, it is generally desirable to combine the liquid epoxy material alone or with other epoxy resins with conventional fillers and curing agents and then to use the spreadable fluid as adhesive for materials, such as wood, plastic, metal, and the like.

In a particularly useful application, the new polyether polyepoxides are employed to impart self-extinguishing characteristics to laminates, particularly paper laminates. The new polyether polyepoxides can be combined with conventional liquid polyepoxides, fillers and curing agents, and in particular for the best flame resistant characteristics some antimony oxide will be added. The mixture is made up as a liquid, suitably by use of a diluent such as a monoepoxide, e.g., allyl glycidyl ether, and the laminate prepared in otherwise conventional manner.

In another useful application, the new polyether is added in amounts from 5 to 50 percent or more, based on the total mixture, to composites of polyepoxides which are expanded during cure by release of gases or vapors to form cellular resin foams. Use of the novel epoxies of this invention imparts flame resistance to the resulting foams. It can also increase the flexibility of the foams.

In addition, the new epoxy ethers can be used as stabilizing agents for various halogen-containing polymers, and particularly the vinyl halide polymers. These products can be used as stabilizers, alone or in combination with other stabilizing agents, such as urea and thiourea derivatives. In most cases, the products are effective as stabilizers in amounts varying from about 1 percent to 5 percent by weight of the polymer being stabilized. The epoxy material can be combined with the halogen-containing polymer by any suitable method, such as by dissolving the products in a suitable solvent or by milling the products together on a suitable roll mill.

They can also be used as secondary plasticizers in combination with plasticizers, such as dioctyl phthalate, and the like.

The following example indicates the utility of the novel epoxy resins of the invention.

Example p-Xylylene glycol and epichlorohydrin were used in the preparation of a resin within the scope of this invention. To a 500 ml. resin flask were charged 69.1 g. (0.5 mol) p-xylene-$\alpha,\alpha'$-diol (p-xylylene glycol) and 230 g. (2.5 mols) epichlorohydrin. As the mixture was stirred at 25° C., 4 g. boron trifluoride etherate was added dropwise during 1.5 hours. An exothermic reaction occurred causing the temperature to rise rapidly to 75–80° C. The temperature was maintained thereafter at 80–100° C. After the addition of catalyst was complete, the mixture was stirred for 2 hours at 55–75° F., treated with 52 g. solid sodium hydroxide and heated at 80–90° C. for 30 minutes. The mixture was cooled, diluted with 400 ml. benzene, and filtered, and solvent was evaporated under vacuum to give about 240 g. of a thick clear liquid (Resin A). Based on analysis, the structure of the product was:

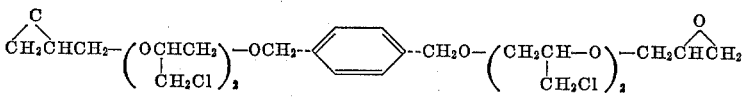

Analysis.—Calc'd for $C_{26}H_{38}O_8Cl_4$: percent C, 50.4; H, 6.2; O, 20.6; Cl, 22.8; mol wt., 620 epoxy value, 0.31 eq./100 g. Found: percent C, 51.8; H, 6.2; O, 20.5; Cl, 21.7; mol wt., 558; epoxy value, 0.32 eq./100 g.

For comparative purposes, a resin outside the scope of this invention was prepared through the use of 4,4'-isopropylidenediphenol. To a mixture of 57 g. (0.25 mol) 4,4'-isopropylidenediphenol and 115 g. (1.25 mols) epichlorohydrin was added, with stirring, 2.2 g. boron trifluoride etherate over a period of 1 hour, during which time the temperature rose from 25° C. to 100° C. The mixture was then stirred for an additional 40 minutes. The mixture was cooled to 80° C., and 23 g. of solid sodium hydroxide was added. The resulting mixture was stirred at 90–100° C. for 2 hours, cooled, diluted with about 500 ml. of a 50:50 mixture, by volume, of benzene and acetone, and filtered. Evaporation of solvent from the filtrate, under vacuum, gave 127 g. of viscous liquid residue (Resin B) which was found by analysis to contain 58.0 percent carbon, 6.5 percent hydrogen, and 21.2 percent chlorine. This resin had a molecular weight of 1450 and an epoxy value of 0.044 equivalent per hundred grams.

Samples of Resin A and Resin B, described above, were each cured between aluminum metal strips, and the lap shear strength of the cured specimens was determined at 25° C. by the method of ASTM D1002–53T. In each instance triethylenetetramine was used as the curing agent, one equivalent, i.e., one-sixth mol, of the amine being used for each equivalent of epoxide groups present in the resin used. In each instance, the curing was carried out by maintaining the specimen for 16 hours at 25° C., then for 8 hours at 70–75° C., and finally for 16 hours at 150° C. The lap shear strength of Resin A, upon curing, was found to be 3200 p.s.i., in contrast with the much lower value of 483 p.s.i. found for the lap shear strength of cured Resin B. Thus, the novel resin obtained through the use of p-xylylene glycol and epichlorohydrin was cured to provide a product of far greater lap shear strength than was exhibited by similarly cured resin obtained through the use of 4,4'-isopropylidenediphenol and epichlorohydrin.

When Resin A was cured in the same curing cycle with an amount of triethylenetetramine, 20 percent, 50 percent, and 100 percent greater than that used in curing the same resin as shown above, the lap shear strength of the cured specimens was 4500 p.s.i., 3700 p.s.i., and 3100 p.s.i., respectively.

When Resin A was similarly cured with a linear polyamide resin (Versamid 140) derived from the condensation of a dimeric fatty acid with a polyamine substance and having an equivalent weight of 143, using 1.20 equivalents of polyamide for each equivalent of epoxide groups in the resin, the lap shear strength of the cured specimen was 3340 p.s.i.

A mixture consisting of a sample of Resin A containing 1.20 equivalents of triethylenetetramine per equivalent of epoxide groups in the resin, and containing 15 weight percent of antimony trioxide based on the total weight of the mixture, was cured by maintaining the mixture for 4 hours at 25° C., then for 16 hours at 70° C., and finally for 4 hours at 140° C. The cured mixture was placed in the flame of a burner until the mixture began to burn. Upon removal of the burning mixture from the flame of the burner, burning of the mixture quickly ceased, thus demonstrating the good fire resistance of the mixture.

Reasonable variation and modification are possible within the spirit and scope of the foregoing disclosure and the appended claims to the invention, the essence of which is a composition of matter having the general formula

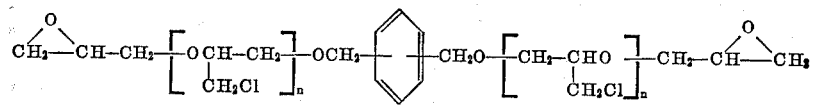

wherein $n$ is an integer of at least 1.

I claim:
1. A compound having the general fourmula

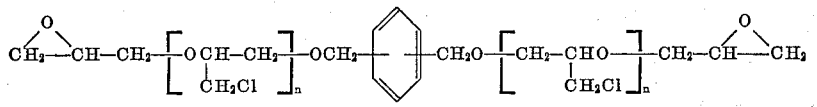

wherein $n$ is an integer of at least 1.

2. The amine or polyamide resin cured compound of claim 1.

3. The cured compound of claim 2 wherein the amine is triethylenetetramine and the polyamide resin is derived from a dimeric fatty acid with a polyamine.

4. The cured product of claim 3 further comprising antimony trioxide.

5. The compound of claim 1 wherein $n$ is an integer of from 1 to 3.

References Cited

UNITED STATES PATENTS

| | | | |
|---|---|---|---|
| 2,898,349 | 8/1959 | Zuppinger et al. | 260—348 |
| 3,096,349 | 7/1963 | Meyer et al. | |

FOREIGN PATENTS 676,308  12/1963  Canada.

WILLIAM H. SHORT, Primary Examiner

T. PERTILLA, Assistant Examiner

U.S. Cl. X.R.

117—127, 161; 260—2.5, 18, 31.8, 37, 348, 830